United States Patent Office 3,021,312
Patented Feb. 13, 1962

3,021,312
POLYMERIZATION OF CYCLIC ESTERS
Eugene F. Cox and Fritz Hostettler, Charleston, W. Va., assignors to Union Carbide Corporation, a corporation of New York
No Drawing. Filed Dec. 3, 1959, Ser. No. 856,908
22 Claims. (Cl. 260—78.3)

This invention relates to a process for polymerizing cyclic esters and to the products resulting therefrom.

The most generally familiar works on the polymerization of lactones are the now classical investigations of W. H. Carothers[1]. For instance, Carothers was able to polymerize delta-valerolactone to poly-delta-valerolactone by heating at 80°–85° C. for a period of about 13 days, or by contacting delta-valerolactone with potassium carbonate catalyst at a temperature of 80°–85° C. for a period of about 5 days. The resulting polymers were soft waxes possessing average molecular weights of approximately 2000 which had relatively low thermal stabilities. The literature reports that attempts to polymerize gamma-butyrolactone have been unsuccessful, and the corresponding polyester is not known. In 1934, there was reported[2] the preparation of poly-epsilon-caprolactone by heating epsilon-caprolactone at about 150° C. for a period of 12 hours, or by contacting epsilon-caprolactone with potassium carbonate at about 150° C. for a period of 5 hours. The resulting epsilon-caprolactone polymers had melting points of about 53°–55° C. and average molecular weights of about 4000. The polymers were hard, brittle waxes which could not be cold-drawn into fibers. Bischoff and Waldon[3] describe the transformation of glycolide under the influence of heat or a trace of zinc chloride into a polymeric solid melting at 220° C. On being distilled in a vacuum it was reconverted to the monomer melting at 86°–87° C. The literature also reports the polymerization of lactide at elevated temperatures to a resinous mass. A similar effect is also obtained at relatively lower temperatures by employing potassium carbonate as the catalyst.

In a broad aspect the present invention is directed to the process for polymerizing monomeric cyclic esters in contact with certain divalent metal catalysts to produce useful polyester products, both the cyclic ester reagents and the catalysts being described hereinafter in a more appropriate section. The average molecular weights of the resulting polymers can range from about several hundred to about several hundred thousand, e.g., about 900 to 250,000 and higher. The homopolymers, copolymers, and terpolymers prepared by the practice of the instant invention are highly useful products as will become apparent at a later section herein. In addition, the polymerization reaction can be conducted at lower temperatures and at faster polymerization rates heretofore unattainable in lactone polymerization art.

Accordingly, one or more of the following objects will be achieved by the practice of this invention, It is an object of this invention to provide a novel process for homopolymerizing monomeric cyclic esters to produce useful homopolymers. It is another object of this invention to provide a novel process for polymerizing an admixture containing at least two different monomeric cyclic esters to produce useful polymers. A further object of this invention is to prepare lactone polymers having a high degree of utility and application in the cosmetic, wax, polish, thickening, molding,

[1] Collected Papers of Wallace H. Carothers, edited by H. Mark and G. S. Whitby, volume I, Interscience Publishers, Inc., New York (1940).
[2] F. J. van Natta, J. W. Hill, and W. H. Carothers, Jour. Amer. Chem. Soc., 56, 455 (1934).
[3] Ber., 36, 1200 (1903).

coating, fiber, film, etc., fields. Other objects will become apparent to those skilled in the art in the light of the instant specification.

In one embodiment the monomeric cyclic esters employed in the polymerization process of this invention can be characterized by the following formula:

I
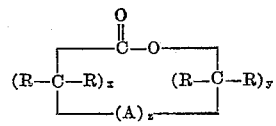

wherein each R, individually, can be hydrogen, alkyl, aryl, alkaryl, aralkyl, cycloalkyl, halo, haloalkyl, alkoxyalkyl, alkoxy, aryloxy, and the like; wherein A can be an oxy (—O—) group, a thio (—S—) group, a divalent saturated aliphatic hydrocarbon group, and the like; wherein $x$ is an integer from 1 to 15 inclusive; wherein $y$ is an integer from 1 to 15 inclusive; wherein $z$ is an integer having a value of zero or one; with the provisos that (a) the sum of $x+y+z$ cannot equal 3, (b) the total number of atoms forming the cyclic ester ring does not exceed 18, preferably does not exceed 9, (c) the total number of organic substituents (such as those described for the R variables) attached to the carbon atoms contained in the cyclic ester ring does not exceed 4, preferably does not exceed 3, (d) from 2 to 4 continuously linked carbon atoms contained in the cyclic ester ring can represent a portion of a saturated cycloaliphatic hydrocarbon nucleus which contains from 4 to 10 ring carbon atoms, and (e) the four R variables attached to any two adjacent carbon atoms contained in the cyclic ester ring can represent a portion of a fused aromatic hydrocarbon nucleus.

With reference to Formula I supra, illustrative R radicals include, among others, methyl, ethyl, n-propyl, isopropyl, n-butyl, sec-butyl, t-butyl, amyl, the hexyls, the heptyls, the octyls, dodecyl, octadecyl, phenyl, benzyl, tolyl, xylyl, ethylphenyl, butylphenyl, phenethyl, phenylpropyl, phenylbutyl, cyclopentyl, 2-propylcyclohexyl, cyclohexyl, 2-methylcyclohexyl, cycloheptyl, chloromethyl, chloroethyl, bromopropyl, bromobutyl, chloro, fluoro, bromo, iodo, methoxymethyl, ethoxyethyl, propoxymethyl, butoxypropyl, methoxy, ethoxy, n-propoxy, n-butoxy, isopentoxy, n-hexoxy, 2-ethylhexoxy, 3-methyloctoxy, decoxy, dodecoxy, octadecoxy, phenoxy, ethylphenoxy, propylphenoxy, dimethylphenoxy, phenylpropoxy, and the like. It is preferred that each R, individually, be hydrogen, alkyl, and/or alkoxy, and preferably still, that each R, individually, be hydrogen, lower alkyl, e.g., methyl, ethyl, n-propyl, isobutyl, and/or lower alkoxy, e.g., methoxy, ethoxy, propoxy, n-butoxy, and the like. It is further preferred that the total number of carbon atoms in the substituents attached to the cyclic ester ring does not exceed twelve. Cycloalkyl and lower alkyl-substituted cycloalkyl radicals which have from 5 to 7 carbon atoms in the cycloaliphatic nucleus also are preferred.

In the discussion of the generic class of monomeric cyclic esters (Formula I) contemplated in the process of the invention, five provisos enumerated from (a) through (e) have been set forth. Proviso (a) states that the sum of $x+y+z$ cannot be a number equal to three. This proviso excludes cyclic ester compounds which contain five atoms in the ring such as, for example,

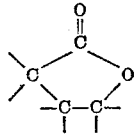

a gamma-butyrolactone

Prior art[4] attempts to polymerize gamma-butyrolactone and the substituted gamma-butyrolactones have been unsuccessful. Attempts to polymerize the cyclic esters, e.g., gamma-butyrolactones, beta-oxa-gamma-butyrolactones, and the like, in the process of this invention likewise have failed. One would postulate that the thermodynamic stability of these monomeric cyclic esters which contain five atoms in the lactone ring is much greater than the corresponding polymers, and that the free energy of interconversion is exceedingly low. Proviso (c) states that the total number of organic substituents attached to the carbon atoms contained in the cyclic ester ring should not exceed four, and preferably should not exceed three. It has been observed that when the total number of organic substituents on the cyclic ester ring approached four or more, then the polymerizability of the cyclic ester monomer in the process of the invention diminished drastically. Proviso (d) states that from 2 to 4 continuously linked carbon atoms contained in the cyclic ester ring can represent a portion of a saturated cycloaliphatic hydrocarbon nucleus which contains from 4 to 10 ring carbon atoms such as, for example, a saturated cycloaliphatic hydrocarbon nucleus derived from cycloalkane, alkyl-substituted cycloalkane, cyclobutane, cyclopentane, cyclohexane, cycloheptane, cyclooctane, methylcyclopentane, methylcyclohexane, and the like. Thus, for example, the following illustrative cyclic esters would be included in this proviso:

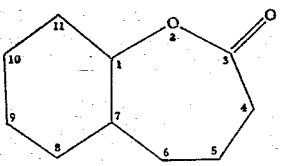

2-oxabicyclo[5.4.0]undecan-3-one (cis or trans)

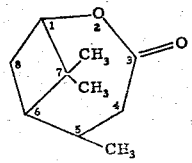

2-oxa-5,7,7-trimethylbicyclo[4.1.1]octan-3-one

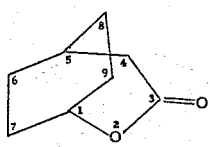

2-oxabicyclo[3.2.2]nonan-3-one

Proviso (e) states that the four R variables attached to any two adjacent carbon atoms contained in the cyclic ester ring can represent a portion of a fused aromatic hydrocarbon nucleus, that is, an aromatic nucleus derived from benzene, alkylbenzene, methylbenzene, propylbenzene, naphthalene and the like. To illustrate this proviso, the following compound is depicted structurally.

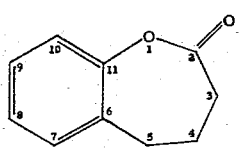

2,3,4,5-tetrahydro-2-keto-benzoxepin

In the structurally depicted compound immediately above, the four R variables which were attached to the carbon atoms designated by numerals 6 and 11 now represent a portion of the fused benzene ring, namely the carbon atoms designated by the numerals 7, 8, 9, and 10. The following compound further illustrates proviso (e).

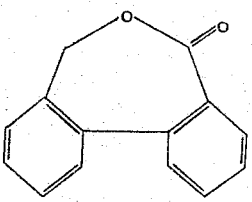

2-(2'-hydroxymethylphenyl)benzene carboxylic acid lactone

Representative monomeric cyclic esters which can be employed as starting materials in the method of the invention include, for example, beta-propiolactone, delta-valerolactone, epsilon-caprolactone, 7-hydroxyheptanoic acid lactone, 8-hydroxy-octanoic acid lactone, 12-hydroxydodecanoic acid lactone, 13-hydroxytridecanoic acid lactone, 14-hydroxytetradecanoic acid lactone, 15-hydroxypentadecanoic acid lactone, 16-hydroxyhexadecanoic acid lactone, 17-hydroxyheptadecanoic acid lactone; the alpha, alpha-dialkyl-beta-propiolactones, e.g., alpha, alpha-dimethyl-beta-propiolactone, alpha, alpha-diethyl-beta-propiolactone, alpha, alpha-dipropyl-beta-propiolactone, and the like; the monoalkyl-delta-valerolactones, e.g., the monomethyl-, monoethyl-, monoisopropyl-, monobutyl-, monohexyl-, monodecyl-, and monododecyl-delta-valerolactones and the like; the dialkyl-delta-valerolactones in which the two alkyl groups are substituted on the same or different carbon atoms in the cyclic ester ring, e.g., the dimethyl-, diethyl-, diisopropyl-, dipentyl-, and di-n-octyl-delta-valerolactones, and the like; the monoalkyl-, dialkyl-, or trialkyl-epsilon-caprolactones, e.g., the monomethyl-, monoethyl-, monoisopropyl-, monohexyl-, mono-n-octyl-, dimethyl-, diethyl-, di-n-propyl-, diisobutyl-, di-n-hexyl-, trimethyl-, triethyl-, and tri-n-propyl-epsilon-caprolactones, and the like; the monoalkoxy- and dialkoxy-delta-valerolactones and epsilon-caprolactones, e.g., monomethoxy-, monoethoxy-, monoisopropoxy-, dimethoxy-, diethoxy-, and dibutoxy-delta-valerolactones and epsilon-caprolactones, and the like. Further illustrative cyclic esters include 3-ethyl-2-keto-1,4-dioxane, gamma(1-isopropyl-4-methylcyclohexyl)-epsilon-caprolactone, 3-bromo-2,3,4,5-tetrahydrobenzoxepin-2-one, 2-(2'-hydroxyphenyl)benzene carboxylic acid lactone, 10-hydroxyundecanoic acid lactone, 2,5,6,7-tetrahydrobenzoxepin - 2 - one, 9 - oxabicyclo[5.2.2]undecan-8 - one, 4 - oxa - 14 - hydroxytetradecanoic acid lactone, alpha, alpha - bis(chloromethyl) - propiolactone, 1,4-dioxane-2-one, 3-n-propyl-2-keto-1,4-dioxane, 3-(2-ethylhexyl) - 2 - keto - 1,4 - dioxane, and the like. Illustrative subclasses of cyclic esters which are eminently suitable in the process of the instant invention include the unsubstituted lactones and the oxalactones which contain from 6 to 8 atoms in the lactone ring, preferably delta - valerolactone, epsilon - caprolactone, the ketodioxanes, and the like; the mono- and poly-alkyl-substituted lactones and oxalactones which contain from 6 to 8 atoms in the lactone ring, preferably the mono- and poly-lower alkyl-delta-valerolactones, epsilon-caprolactones, and their corresponding oxalactones wherein the alkyl substituent(s) contains from 1 to 4 carbon atoms, and the like; and the mono- and polyalkoxy-substituted lactones and oxalactones which contain from 6 to 8 atoms in the lactone ring, preferably the mono- and poly-lower alkoxy-delta-valerolactones, epsilon-caprolactones, and their corresponding oxalactones wherein the alkoxy substituent(s) contains from 1 to 4 carbon atoms.

The unsubstituted and substituted delta-valerolactones, epsilon-caprolactones, zeta-enantholactones, and higher membered lactones, e.g., mono- and polyalkyl-substituted delta-valerolactones, mono- and polyalkoxy-substituted delta-valerolactones, mono- and polycycloalkyl-substituted delta-valerolactones, aryl-substituted delta-valerolactones, mono- and polyhaloalkyl-substituted delta-

[4] W. H. Carothers, G. L. Dorough, and F. J. van Natta, Jour. Amer. Chem. Soc., 54, 761 (1932).

valerolactones, mono- and polyalkyl-substituted epsilon-caprolactones, mono- and polyalkoxy-epsilon-caprolactones, aryl-substituted epsilon-caprolactones, mono- and polyhaloalkyl-substituted epsilon-caprolactones, mono- and polyalkyl-substituted zeta-enantholactones, and various other lactones described previously can be prepared by reacting the corresponding cyclic ketone with an anhydrous solution comprising peracetic acid and acetone. It is desirable to add the peracetic acid solution to an excess of ketone, e.g., 5 to 1 molar ratio of ketone to peracetic acid, in a still kettle maintained under reflux. The pressure can be adjusted so as to provide a kettle temperature of, for example, about 70° C. Acetone, acetic acid byproduct, and minor amounts of ketone can be continuously removed throughout the addition period. Subsequently, the lactone product can be recovered from the still kettle by conventional techniques such as by distillation.

Stroll and Rouvé[5] report the preparation of lactones which contain up to 22 carbon atoms in the lactone nucleus by a process which comprises contacting the corresponding terminal hydroxy saturated aliphatic monocarboxylic acid with benzenesulfonic acid catalyst in boiling benzene. These authors also report the preparation of other lactones such as 14-alkyl-14-hydroxytetradecanoic acid lactone, e.g., 14-hydroxypentadecanoic acid lactone, and oxa-15-hydroxypentadecanoic acid lactone, e.g., 12-oxa-15-hydroxypentadecanoic acid lactone. Palomaa and Tonkola[6] teach the preparation of 3-oxa-6-hydroxyhexanoic acid lactone by heating the corresponding terminal hydroxy saturated aliphatic monocarboxylic acid. The preparation of 2-keto-1,4-dioxane, 3-alkyl-2-keto-1,4-dioxane, polyalkoxy-substituted delta-valerolactone, mono- and polyalkyl-substituted delta-valerolactone, alkoxyalkyl-substituted delta-valerolactone, etc., is recorded by Carothers et al.[7] The preparation of dialkyl-substituted, dihalo-substituted lactone, e.g., gamma, delta-dibromo-gamma, delta-dimethyl-delta-valerolactone is reported in the literature by Levina et al.[8] German Pat. No. 562,827 discloses the preparation of 2,3,4,5-tetrahydrobenzoxepin-2-one whereas the literature[9] reports the position isomer, namely 2,5,6,7-tetrahydrobenzoxepin-2-one. Cycloalkyl-substituted epsilon-caprolactone, e.g., gamma(1-isopropyl-4-methylcyclohexyl)-epsilon-caprolactone is disclosed by Belov and Kheifits.[10] McKay et al.[11] have recorded the preparation of halo-substituted, haloalkyl-substituted delta-valerolactone. The literature also reports the preparation of various other cyclic esters.

The catalysts employed in the process of the invention are prepared by the mutual reaction and/or interaction of an alkaline earth metal hexammoniate, i.e., calcium, barium, or strontium hexammoniate, an olefin oxide, and an organic nitrile. The reaction is carried out in a liquid ammonia medium. In principle, the reaction temperature can range from above about the freezing point of ammonia, i.e., about −78° C., to the critical temperature of ammonia, i.e., about +133° C. The preservation of a liquid ammonia phase obviously requires pressurized equipment at reaction temperatures above the atmospheric boiling point of ammonia, i.e., about −33° C. A reaction temperature in the range of from above about the freezing point of the liquid ammonia medium to about 25° C. is preferred. In a more preferred aspect the upper temperature limitation is about 10° C.

The ratio of the three components, i.e., alkaline earth metal hexammoniate, olefin oxide, and organic nitrile, can be varied over a wide range in the preparation of the catalysts. The reaction is conducted, as indicated previously, in an excess liquid ammonia medium. Thus, very active catalysts can be prepared by employing from about 0.3 to 1.0 mol of olefin oxide per mol of metal hexammoniate, and from about 0.2 to 0.9 mol of organic nitrile per mol of metal hexammoniate. Extremely active catalyst can be prepared by employing from about 0.4 to 1.0 mol of olefin oxide per mol of metal hexammoniate, and from about 0.3 to 0.8 mol of organic nitrile per mol of metal hexammoniate. It should be noted that the alkaline earth metal hexammoniate, $M(NH_3)_6$, wherein M can be calcium, barium, or strontium, contains alkaline earth metal in the zero valence state. Thus, the concentration or mol ratio of the olefin oxide and the organic nitrile is more conveniently based upon alkaline earth metal per se rather than alkaline earth metal hexammoniate.

The olefin oxides contemplated as reagent in the preparation of the catalysts are those containing solely carbon, hydrogen, and oxirane oxygen which is bonded to vicinal or adjacent carbon atoms to form an epoxy group, i.e.,

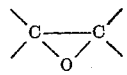

Illustrative olefin oxides include, among others, ethylene oxide, propylene oxide, 1,2-epoxybutane, 2,3-epoxybutane, the epoxypentanes, the epoxyhexanes, the epoxyoctanes, the epoxydecanes, the epoxydodecanes, 2,4,4-trimethyl-1,2-epoxypentane, 2,4,4-trimethyl-2,3-epoxypentane, styrene oxide, cyclohexylepoxyethane, 1-phenyl-1,2-epoxypropane, 7-oxabicyclo[4.1.0]heptane, 6-oxabicyclo[3.1.0]hexane, 3-methyl-6-oxabicyclo[3.1.0]hexane, 4-ethyl-6-oxabicyclo[3.1.0]hexane, and the like. Lower olefin oxides are preferred, that is, ethylene oxide, propylene oxide, 1,2-epoxybutane, 2,3-epoxybutane, and the like.

The organic nitriles which are employed in the catalyst preparation, are preferably, the saturated aliphatic nitriles. Among the organic nitriles which are contemplated, include, for example, acetonitrile, propionitrile, butyronitrile, valeronitrile, isovaleronitrile, capronitrile, caprylonitrile, caprinitrile, and the like. Lower saturated aliphatic organic nitriles are preferred, that is, acetonitrile, propionitrile, butyronitrile, and the like. Acetonitrile is most preferred.

In the preparation of the catalysts, it appears that the olefin oxide reagent becomes bonded to the alkaline earth metal through the oxygen atom, i.e., R—O—M— wherein R would be ethyl when the olefin oxide is ethylene oxide, and M is the alkaline earth metal. However, analyses indicate that very little, if any, of the organic nitrile reagent is contained in the final product. Moreover, tests indicated the presence of alkylideneimine, e.g., ethylidene, which is probably formed by the reduction of organic nitrile, e.g., acetonitrile, by the metal, e.g., calcium, in liquid ammonia.

The preparation of the catalysts can be suitably carried out by dissolving alkaline earth metal in excess liquid ammonia medium, the reaction vessel being contained in, for example, a Dry Ice-acetone slush bath. To the resulting alkaline earth metal hexammoniate in liquid ammonia medium, there are added the olefin oxide and organic nitrile reagents, preferably as a mixture. If desired, the olefin oxide and organic nitrile reagents can be added separately. However, it is preferred that the separate addition of said reagents to the ammonia solution be conducted simultaneously. During the catalyst preparation agitation of the reaction mixture is desirable. Subsequently, the Dry Ice-acetone bath is removed, and the reaction vessel is exposed to room temperature conditions. After a period of time the excess ammonia weathers or evaporates from the reaction product leaving solid catalytically active material in the reaction vessel. After this, the catalytically active material can be suspended or slurried in an inert, normally-liquid organic vehicle such as, for example, lower dialkyl ether of alkylene glycol, e.g., the dimethyl, diethyl, or dipropyl ethers of diethylene glycol; dioxane; decahydronaphthalene;

---
[5] Helv. Chim. Acta, 18, 1087 (1935).
[6] Ber., 66, 1629 (1933).
[7] See footnote 1.
[8] Zhur. Obshchei Khim. 24, 1439 (1954).
[9] Ber., 68B, 1170 (1935)
[10] J. Gen. Chem. USSR, 27, 1459 (1957).
[11] J. Amer. Chem. Soc., 77, 5601-6 (1955).

saturated aliphatic and cycloaliphatic hydrocarbons, e.g., hexane, heptane, cyclohexane, or 2-methylcycloheptane; and the like.

The catalysts are employed in catalytically significant quantities to effect the polymerization of the cyclic ester(s). In general, a catalyst concentration in the range of from about 0.001, and lower, to about 10, and higher, weight percent, based on the weight of total monomeric feed, is suitable. A catalyst concentration in the range of from about 0.01 to about 3.0 weight percent is preferred. A catalyst concentration in the range of from about 0.05 to about 1.0 weight percent is highly preferred. For optimum results, the particular catalyst employed, the nature of the monomeric reagent(s), the operative conditions under which the polymerization reaction is conducted, and other factors will largely determine the desired catalyst concentration.

The polymerization reaction can be conducted over a wide temperature range. Depending upon various factors such as the nature of the monomeric reagent(s) employed, the particular catalyst employed, the concentration of the catalyst, and the like, the reaction temperature can be as low as −50° C., and lower, and as high as 250° C., and higher. A suitable temperature range is from about −20° to about 225° C. A reaction temperature in the range of from about −10° to about 200° C. is preferred.

The polymerization reaction preferably occurs in the liquid phase, and to this extent sufficient pressure is employed to maintain an essentially liquid reaction mixture regardless whether or not an inert normally-liquid organic vehicle is employed. Preferably, the polymerization reaction is conducted under an inert atmosphere, e.g., nitrogen, butane, helium, etc. The ultimate molecular weight of the resulting polymer will depend, to an extent, upon various factors such as the temperature, the choice and concentration of the catalyst, the use and amount of an inert normally-liquid organic vehicle(s), and the like.

In general, the polymerization reaction time will vary depending on the operative temperature, the nature of the monomeric cyclic esters employed, the particular catalyst and the concentration employed, the use of an inert normally-liquid organic vehicle, and other factors. The reaction time can vary from several seconds to several hours, or more, depending on the variables illustrated above.

It is preferred to conduct the polymerization reaction in the essential absence of impurities which contain active hydrogen since the presence of such impurities tends to deactivate the catalyst and/or increase the induction period. The minimization or essential avoidance of impurities such as water, carbon dioxide, aldehydes, ketones, etc., is highly desirable. It is also preferred that the polymerization reaction be conducted under substantially anhydrous conditions.

When polymerizing an admixture containing at least two different cyclic esters, the proportions of said cyclic esters can vary over the entire range. Broadly the concentration of each monomeric cyclic ester is in the range of from about 3 to about 97 weight percent, based on the total weight of said cyclic esters. The preferred range is from about 15 to about 85 percent. Admixtures containing epsilon-caprolactone and mono- and/or polyalkyl-substituted epsilon-caprolactone (including isomeric mixtures thereof) are highly preferred as starting materials in the process of the invention. Admixtures containing different mono- and/or polyalkyl-substituted epsilon-caprolactones (including isomeric mixtures of the same and/or different mono- and/or polyalkyl-substituted epsilon-caprolactones) also are highly preferred.

The polymers of this invention can be prepared via the bulk polymerization, suspension polymerization, or the solution polymerization routes. The polymerization reaction can be carried out in the presence of an inert normally-liquid organic vehicle such as, for example, aromatic hydrocarbons, e.g., benzene, toluene, xylene, ethylbenzene, and the like; various oxygenated organic compounds such as anisole, the dimethyl and diethyl ethers of ethylene glycol, of propylene glycol, of diethylene glycol, and the like; normally-liquid saturated hydrocarbons including the open chain, cyclic, and alkyl-substituted cyclic saturated hydrocarbons such as hexane, heptane, various normally liquid petroleum hydrocarbon fractions, cyclohexane, the alkylcyclohexanes, decahydronaphthalene, and the like. If desired, a mixture of mutually miscible inert normally-liquid organic vehicles can be employed.

The process of the invention can be executed in a batch, semi-continuous, or continuous fashion. The reaction vessel can be a glass vessel, steel autoclave, elongated metallic tube, or other equipment and material employed in the polymer art. The order of addition of catalyst and monomeric reagent(s) does not appear to be critical. A suitable procedure is to add the catalyst to the reaction zone containing the monomeric reagent(s) and inert organic vehicle, if any. It is preferred that the catalyst be added as a suspension in an inert normally-liquid organic vehicle. Incremental addition of catalyst to the reaction zone can be employed. If desired, the above procedure can be reversed, that is, the monomeric reagent(s) per se or as a solution or suspension in an inert organic vehicle can be added to the reaction zone containing the catalyst (or catalyst suspension). Also, the catalyst, reagent(s), and inert organic vehicle, if any, can be added to the reaction zone simultaneously. The reaction zone (be it a closed vessel or an elongated tube) can be fitted with an external heat exchanger to thus control undue temperature fluctuations, or to prevent any possible "run-away" reaction temperatures due to the exothermic nature of the reaction. In a continuous operation employing as the reaction zone an elongated tube or conduit, the use of one or a plurality of separate heat exchangers can be conveniently used. In a batch operation, stirring means can be provided for agitating the reaction mixture, as desired.

Unreacted monomeric reagent oftentimes can be recovered from the reaction product by conventional techniques such as by heating said reaction product under reduced pressure. Removal of unreacted monomeric reagent(s) and/or inert organic vehicle can be accomplished by mechanical means such as treatment of the reaction product in a Marshall Mill and the like. The polymer product also can be recovered from the reaction product by washing said reaction product with an inert normally-liquid organic vehicle, e.g., heptane, and subsequently drying same under reduced pressure at slightly elevated temperatures. Another route involves dissolution in a first inert organic vehicle, followed by the addition of a second inert organic vehicle which is miscible with the first vehicle but which is a non-solvent for the polymer product, thus precipitating the polymer product. If desired, the reaction product can be dissolved in an inert organic vehicle such as acetone, and the like, followed by the addition of sufficient water to the resulting solution, said water being miscible with said inert organic vehicle but being a non-solvent for the water-insoluble polymer thereby precipitating the polymer product. Recovery of the precipitated polymer can be effected by filtration, decantation, etc., followed by drying same as indicated previously.

The linear polyester products resulting from the process of the invention can be characterized by the following structural unit:

II
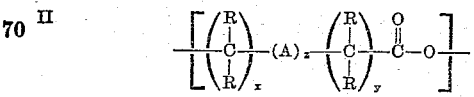

wherein the variables R, A, $x$, $y$, and $z$, have the same values as shown in Formula I supra. Of course, the five provisos enumerated as ($a$) through ($e$) set forth in the discussion of Formula I supra likewise apply to the structural unit designated as Formula II above. In addition, as indicated previously, the molecular weights of the polyester products can range from about several hundred to about several hundred thousand, e.g., from about 900 to about 250,000, and higher. The ultimate molecular weight and properties of the polyester products will depend, in the main, upon the choice of the cyclic ester(s) and catalyst, the concentration of the catalyst, the operative conditions employed, e.g., temperature, etc., the purity of the monomeric reagent(s) and catalyst, the use and amount of an inert normally-liquid organic vehicle, and the like.

It is readily apparent that the linear homopolymers are essentially characterized by the same recurring unit which falls within the scope of Formula II supra. The copolymers, terpolymers, etc., on the other hand, can contain as little as 1.0 weight percent, and lower, and upwards to 99 weight percent, and higher, of the same recurring unit. Desirable polymers are those in which the weight percent of the different recurring units is in the range of from about 3 to about 97. In the highly preferred copolymers the weight percent of the two different recurring units is in the range of from about 15 to about 85.

The polymers obtained by the process of the invention are a useful class of polyester compounds. These polymers can range from viscous liquids to extremely tough, crystalline solids. The polymers in the range of from very viscous liquids to relatively low molecular weight, wax-like solids are useful in the preparation of cosmetics, polishes, and waxes, and as thickening agents for various lubricants. The polymers can be employed to size cellulosic material or they can be used as anti-static agents in the treatment of fibrous materials. They can also be employed as protective coatings and/or impregnants. The solid polymers are useful for the production of various shaped articles such as brush handles, buttons, lamp bases, toys, and the like. The crystalline polymers can be shaped into useful fibers by conventional means such as by extrusion. The solid crystalline and non-crystalline polymers also are useful in the preparation of films by such techniques as milling on a two-roll mill, calendering, solvent casting, and the like.

In passing, it should be noted that one apparent advantage afforded by the practice of the invention is the preparation of copolymers, terpolymers, etc., whose physical characteristics can be "tailor-made" to fit desired fields of applications and uses. In other words, by adjusting the concentration of the monomeric charge to a particular polymerization system, copolymers, terpolymers, etc., which cover a wide spectrum of properties and characteristics can be prepared, e.g., soft, rubbery polymers to highly crystalline polymers.

In the illustrative operative examples to follow, the polymeric product oftentimes is described as possessing a certain reduced viscosity value. By this term, i.e. "reduced viscosity," is meant a value obtained by dividing the specific viscosity by the concentration of the polymer in the solution, the concentration being measured in grams of polymer per 100 milliliters of solvent at a given temperature. The specific viscosity is obtained by dividing the difference between the viscosity of the solution and the viscosity of the solvent by the viscosity of the solvent. The reduced viscosity value is an indication of the molecular weight of the polymer. Unless otherwise indicated, the reduced viscosity value was determined at 30° C.

Also, in the illustrative operative examples below, the polymerization reaction was generally conducted under an inert atmosphere, e.g., nitrogen. The reaction vessel and contents, i.e., cyclic ester(s), catalyst, and inert organic vehicle, if any, were maintained, usually under agitation, in a constant temperature, e.g., 90° C., or the reaction vessel containing the cyclic ester(s) was maintained, usually under agitation, in a constant temperature and subsequently the catalyst was added thereto. Since the polymerization reaction in general, was exothermic a rise in temperature was observed, e.g., 140° to 150° C. In several instances the period recorded was the time observed in which the rotation of the mechanical stirrer ceased due to the high viscosity of the contents in the reaction vessel. In most cases the reaction vessel was left in the constant temperature bath for an additional period of time, e.g., about 20 minutes, or longer. Unless otherwise indicated, the examination or description of the polymeric product was conducted at room temperature, i.e., about 23° C. In general, the conversion of monomer to polymer was quantitative.

EXAMPLE 1

Liquid ammonia was added to a resin flask (maintained in a Dry Ice-acetone bath, the temperature of which was about −70° C.). Calcium metal nodules (40 parts by weight) was then dissolved in the stirred liquid ammonia. The characteristic deep blue color of calcium hexammoniate appeared. To the resulting solution there were slowly added 29 parts by weight of acetonitrile and 40 parts by weight of propylene oxide. Subsequently, the external Dry Ice-acetone bath then was removed, and the flask was exposed to room temperature conditions, i.e., approximately 22° C., until the liquid ammonia phase had disappeared (weathered or evaporated from the system) and a solid remained. This solid product was placed in a stainless steel container, and said product was covered with heptane. Subsequently, this admixture was agitated in a reciprocating paint shaker until a catalyst slurry or suspension in heptane was produced. Throughout the operation care was taken to exclude the presence of oxygen, water, and carbon dioxide from the reaction system.

EXAMPLE 2

(A) To a reaction vessel maintained under a nitrogen atmosphere and which contained epsilon-caprolactone, there was charged a quantity of the catalyst slurry prepared as described in Example 1 in an amount so as to give an admixture containing 0.2 weight percent calcium (calculated as the metal), based on the weight of said epsilon-caprolactone. The reaction vessel then was placed in a constant temperature bath maintained at 90° C. Within 3 minutes the mechanical stirrer ceased due to the high viscosity of the contents in the reaction vessel. Thereafter, the polymeric product was recovered. There was obtained a tough, ivory, crystalline solid which possessed a reduced viscosity value of 0.91 (measured at 0.4 gram of polymer in 100 ml. of chloroform).

(B) In an analogous manner as above, when 8-hydroxyoctanoic acid lactone is substituted for epsilon-caprolactone, there is obtained a solid polymer.

EXAMPLE 3

(A) To a reaction vessel maintained under a nitrogen atmosphere and which contained a mixture of 75 parts by weight of delta-valerolactone and 25 parts by weight of beta-methyl-delta-valerolactone, there was charged a quantity of the catalyst slurry prepared as described in Example 1 in an amount so as to give an admixture containing 0.2 weight percent calcium (calculated as the metal), based on the total weight of the lactone feed. The reaction vessel then was placed in a constant temperature bath maintained at 90° C. Within 3 minutes the stirrer ceased due to the high viscosity of the contents in the reaction vessel. Thereafter, the polymeric product was recovered. There was obtained a white, semi-crystalline, soft solid which possessed a reduced viscosity value of 0.51 (measured at 0.4 gram of polymer in 100 ml. of chloroform).

(B) In an analogous manner as above, when equal parts by weight of 12-oxa-15-hydroxypentadecanoic acid lactone and 7-hydroxyheptanoic acid lactone are employed as the monomeric feed, substantially similar results are obtained.

EXAMPLE 4

(A) To a reaction vessel maintained under a nitrogen atmosphere and which contained a mixture of 75 parts by weight of epsilon-caprolactone and 25 parts by weight of an isomeric mixture of methyl-epsilon-caprolactone, there was charged a quantity of the catalyst slurry prepared as described in Example 1 in an amount so as to give an admixture containing 0.2 weight percent calcium (calculated as the metal), based on the total weight of the lactone feed. The isomeric mixture contained, by weight, approximately 30 percent gamma-methyl-epsilon-caprolactone, about 30 percent epsilon-methyl-epsilon-caprolactone, and about 40 percent beta-methyl- and delta-methyl-epsilon-caprolactone. This isomeric lactone mixture was prepared by reacting a mixture of 2-, 3-, and 4-methylcyclohexanone with peracetic acid. The reaction vessel then was placed in a constant temperature bath maintained at 90 C. Within 2 minutes the stirrer ceased due to the high viscosity of the contents in the reaction vessel. Thereafter, the polymeric product was recovered. There was obtained a tough, semi-crystalline, ivory solid product which possessed a reduced viscosity value of 1.10 (measured at 0.4 gram of polymer in 100 ml. of chloroform).

(B) In an analogous manner as above, when equal parts by weigth of 9-oxabicyclo[5.2.2]undecan-8-one and 1,4-dioxane-2-one are employed as the monomeric feed, essentially similar results are obtained.

EXAMPLE 5

(A) A catalyst is prepared in a similar manner as set forth in Example 1 supra except that 22 parts by weight of ethylene oxide is used in lieu of 40 parts by weight of propylene oxide.

To a reaction vessel maintained under a nitrogen atmosphere and which contains an isomeric mixture composed of a major proportion by weight of gamma-octyl-epsilon-caprolactone and a minor proportion by weight of epsilon-octyl-epsilon caprolactone, there is charged a quantity of the catalyst slurry prepared above in an amount so as to give an admixture containing 1.0 weight percent calcium (calculated as the metal), based on the total weight of octyl-epsilon-caprolactone. The reaction vessel then is placed in a constant temperature bath maintained at 90° C. for a period of 10 minutes. There is obtained a very viscous liquid product.

(B) In an analogous manner as above, when equal parts by weight of 9-oxabicyclo[5.2.2]undecan-8-one and 1,4-dioxane-2-one are employed as the monomeric feed, there is obtained a solid product.

EXAMPLE 6

(A) A catalyst is prepared in a similar manner as set forth in Example 1 supra except 27 parts by weight of propionitrile and 22 parts by weight of ethylene oxide are used in lieu of 29 parts by weight of acetonitrile and 40 parts by weight of propylene oxide.

To a reaction vessel maintained under a nitrogen atmosphere and which contains equal parts, by weight, of 2,4 - dimethyl-4-methoxymethyl-5-hydroxypentanoic acid lactone and epsilon-caprolactone, there is charged a quantity of the catalyst slurry prepared above in an amount so as to give an admixture containing 0.5 weight percent calcium (calculated as the metal), based on the total weight of the monomeric charge. The reaction vessel then is placed in a constant temperature bath maintained at 90° C. for a period of 30 minutes. Thereafter, the reaction product is dissolved in acetone and reprecipitated in water. There is obtained a soft, solid copolymer.

(B) In an analogous manner as above, when cis-3-oxabicyclo[5.4.0]undecan-4-one is employed as the lactone feed, essentially similar results are obtained.

EXAMPLE 7

(A) A catalyst is prepared in a similar manner as set forth in Example 1 supra except that 30 parts by weight of n-butyronitrile and 36 parts by weight of butylene oxide are used in lieu of 29 parts by weight of acetonitrile and 40 parts by weight of propylene oxide.

To a reaction vessel maintained under a nitrogen atmosphere and which contains ortho-(2-hydroxyethyl)-phenylacetic acid lactone, there is charged a quantity of the catalyst slurry prepared above in an amount so as to give an admixture containing 1.0 weight percent calcium (calculated as the metal), based on the weight of said ortho-(2-hydroxyethyl)-phenylacetic acid lactone. The reaction vessel then is placed in a constant temperature bath maintained at 90° C. for a period of 12 minutes. There is obtained a solid polymer.

(B) In an analogous manner as above, when 2,3,4,5-tetrahydrobenzoxepin-2-one is substituted for the ortho-(2-hydroxyethyl)-phenylacetic acid lactone, there is obtained a solid polymer.

EXAMPLE 8

(A) A catalyst is prepared in a similar manner as set forth in Example 1 supra except that 80 parts by weight of strontium is used in lieu of 40 parts by weight of calcium.

To a reaction vessel maintained under a nitrogen atmosphere and which contains epsilon-caprolactone, there is charged a quantity of the catalyst slurry prepared above in an amount so as to give an admixture containing 0.8 weight percent strontium (calculated as the metal), based on the weight of said epsilon-caprolactone. The reaction vessel then is placed in a constant temperature bath maintained at 90° C. for a period of 10 minutes. Thereafter, the polymeric product is recovered. There is obtained a tough, white, film-forming solid.

(B) In an analogous manner as above, when gamma(1-isopropyl - 4 - methylcyclohexyl)-epsilon-caprolactone is substituted for epsilon-caprolactone, a very viscous liquid is obtained.

EXAMPLE 9

(A) A catalyst is prepared in a similar manner as set forth in Example 1 supra except that 40 parts by weight of n-butyronitrile is used in lieu of 29 parts by weight of acetonitrile. To a reaction vessel maintained under a nitrogen atmosphere and which contains delta-valerolactone, there is charged a quantity of the catalyst slurry prepared above in an amount so as to give an admixture containing 1.0 weight percent calcium (calculated as the metal), based on the weight of said delta-valerolactone. The reaction vessel then is placed in a constant temperature bath maintained at 90° C. for a period of 45 minutes. Thereafter, the polymeric product is recovered. There is obtained a tough, solid homopolymer.

(B) In an analogous manner as above, when 3-ethyl-2-keto-1,4-dioxane is substituted for delta-valerolactone, a very viscous liquid product is obtained.

EXAMPLE 10

(A) A catalyst is prepared in a similar manner as set forth in Example 1 supra except that 137 parts by weight of barium is used in lieu of 40 parts by weight of calcium.

To a reaction vessel maintained under a nitrogen atmosphere and which contains zeta-enantholactone, there is charged a quantity of the catalyst slurry prepared above an an amount so as to give an admixture containing 1.0 weight percent calcium (calculated as the metal), based on the weight of said zeta-enantholactone. The reaction vessel then is allowed to stand, at room temperature, for a period of 3 hours. Thereafter, the polymeric product is recovered. There is obtained a white, solid homopolymer.

(B) In an analogous manner as above, when 10-hydroxyundecanoic acid lactone is substituted for zeta-enantholactone, essentially similar results are obtained.

EXAMPLES 11–13

In Examples 11 through 13, various copolymers are produced by polymerizing an admixture of two lactones in the presence of the catalyst slurry prepared in Example 1 supra. The procedure employed is similar to that set forth immediately preceding the operative examples. The pertinent data and results are recorded in Table I below.

Table I

| Example Number | Lactone Charge [1] | Catalyst Concentration [2] | Temp., °C. | Time, Min. | Description of Copolymer |
|---|---|---|---|---|---|
| 11 | 70 epsilon-caprolactone/30 beta-methyl-delta-valerolactone. | 1.0 | 90 | 30 | Tough solid. |
| 12 | 80 epsilon-caprolactone/20 beta-methyl-delta valerolactone. | 1.0 | 90 | 30 | Tough, film-forming solid. |
| 13 | 85 epsilon-caprolactone/15 beta-methyl-delta-valerolactone. | 1.0 | 90 | 40 | White, waxy solid. |

[1] Parts by weight.
[2] Weight per cent calcium (calculated as the metal), based on the total weight of lactone charge.
NOTE.—Beta-methyl-delta valerolactone redistilled; B.P. 137° C. at 1.5 mm. of Hg; $n$ 31/D of 1.4480.

EXAMPLES 14–15

In Examples 14 and 15, various copolymers are produced by polymerizing an admixture of two lactones in the presence of the catalyst slurry prepared in Example 1 supra. The procedure employed is similar to that set forth immediately preceding the operative examples. The pertinent data and results are recorded in Table II below.

Table II

| Example Number | Lactone Charge [1] | Catalyst Concentration [2] | Temp., °C. | Time, Min. | Description of Polyester |
|---|---|---|---|---|---|
| 14 | 30 zeta-enantholactone/70 epsilon-caprolactone. | 1.0 | 90 | 30 | Tough, white solid. |
| 15 | 20 zeta-enantholactone/80 espilon-caprolactone. | 1.0 | 90 | 30 | Do. |

[1] Admixture of two lactones is expressed as parts by weight.
[2] Weight percent calcium (calculated as the metal), based on total weight of lactone charge.
NOTE.—Zeta-enantholactone redistilled; B.P. 72° C. at 4 mm. of Hg; $n_D^{30}$ of 1.4689.

EXAMPLE 16

(A) A catalyst is prepared in a similar manner as set forth in Example 1 supra except that 42 parts by weight of n-valeronitrile and 49 parts by weight of cyclohexene oxide are used in lieu of 20 parts by weight of acetonitrile and 40 parts by weight of propylene oxide.

To a reaction vessel maintained under a nitrogen atmosphere and which contains epsilon-caprolactone, there is charged a quantity of the catalyst slurry prepared above in an amount so as to give an admixture containing 1.0 weight percent calcium (calculated as the metal), based on the weight of said epsilon-caprolactone. The reaction vessel then is placed in a constant temperature bath maintained at 90° C. for a period of one hour. Thereafter, the reaction product is dissolved in chloroform and reprecipitated in petroleum ether. There is obtained a tough, white, crystalline homopolymer.

(B) In an analogous manner as above, when gamma-methyl-delta-isopropyl-epsilon-caprolactone is substituted for epsilon-caprolactone, there is obtained a solid polymer.

EXAMPLE 17

(A) A catalyst is prepared in a similar manner as set forth in Example 1 supra except that 60 parts by weight of styrene oxide is used in lieu of 40 parts by weight of propylene oxide.

To a reaction vessel maintained under a nitrogen atmosphere and which contains 2-keto-1,4-dioxane, there is charged a quantity of the catalyst slurry prepared above in an amount so as to give an admixture containing 1.0 weight percent calcium (calculated as the metal), based on the weight of said 2-keto-1,4-dioxane. The reaction vessel then is placed in a constant temperature bath maintained at 90° C. for a period of about one hour. Thereafter, the polymeric product is recovered. There is obtained a tough, solid copolymer.

(B) In an analogous manner as above, when 2,3,4,5-tetra-hydro-2-keto-benzoxepin is substituted for 2-keto-1,4-dioxane, there is obtained a solid polymer.

Although the invention has been illustrated by the preceding examples, the invention is not to be construed as limited to the materials employed in the above exemplary examples, but rather, the invention encompasses the generic area as hereinbefore disclosed. Various modifications and embodiments of this invention can be made without departing from the spirit and scope thereof.

What is claimed is:

1. A process which comprises contacting a cyclic ester characterized by the following formula:

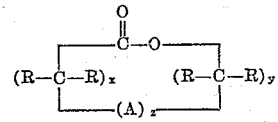

wherein each R, individually, is selected from the group consisting of hydrogen, alkyl, aryl, alkaryl, aralkyl, cycloalkyl, halo, haloalkyl, alkoxyalkyl, alkoxy, aryloxy, a portion of an aromatic hydrocarbon nucleus which nucleus is fused to the cyclic ester ring, and a portion of a saturated cycloaliphatic hydrocarbon nucleus which nucleus contains from 4 to 10 carbon atoms and which is fused to the cyclic ester ring; wherein A is selected from the group consisting of an oxy group, a thio group, and a divalent saturated aliphatic hydrocarbon group; wherein $x$ is an integer in the range of from 1 to 15 inclusive; wherein $y$ is an integer in the range of from 1 to 15 inclusive; and wherein $z$ is an integer selected from the group consisting of zero and one; with the provisos that (a) the sum of $x+y+z$ cannot equal three, (b) the total number of atoms forming the cyclic ester ring does not exceed 18, and (c) the total number of organic substituents attached to the carbon atoms contained in the cyclic ester ring does not exceed four; with from about 0.001 to about 10 weight percent of a polymerization catalyst, based on the total weight of cyclic ester; under substantially anhydrous conditions; for a period of time sufficient to produce a polymer; said polymerization catalyst being prepared by a process which comprises reacting alkaline earth metal hexammoniate with from about 0.3 to 1.0 mol of olefin oxide and from about 0.2 to 0.9 mol of saturated aliphatic organic nitrile, based on 1.0 mol of said alkaline earth metal hexammoniate, said reaction being conducted in an excess liquid ammonia medium, and subsequently evaporating from the resulting product mixture the excess liquid ammonia.

2. A process which comprises contacting an admixture comprising at least two cyclic esters which are characterized by the following formula:

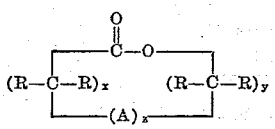

wherein each R, individually, is selected from the group consisting of hydrogen, alkyl, aryl, alkaryl, aralkyl, cycloalkyl, halo, haloalkyl, alkoxyalkyl, alkoxy, aryloxy, a portion of an aromatic hydrocarbon nucleus which nucleus is fused to the cyclic ester ring, and a portion of a saturated cycloaliphatic hydrocarbon nucleus which nucleus contains from 4 to 10 carbon atoms and which is fused to the cyclic ester ring; wherein A is selected from the group consisting of an oxy group, a thio group, and a divalent saturated aliphatic hydrocarbon group; wherein $x$ is an integer in the range of from 1 to 15 inclusive; wherein $y$ is an integer in the range of from 1 to 15 inclusive; and wherein $z$ is an integer selected from the group consisting of zero and one; with the provisos that (a) the sum of $x+y+z$ cannot equal three, (b) the total number of atoms forming the cyclic ester ring does not exceed 18, and (c) the total number of organic substituents attached to the carbon atoms contained in the cyclic ester ring does not exceed four; with from about 0.001 to about 10 weight percent of a polymerization catalyst, based on the total weight of cyclic ester; under substantially anhydrous conditions; for a period of time sufficient to produce a polymer; said polymerization catalyst being prepared by a process which comprises reacting alkaline earth metal hexammoniate with from about 0.3 to 1.0 mol of olefin oxide and from about 0.2 to 0.9 mol of saturated aliphatic organic nitrile, based on 1.0 mol of said alkaline earth metal hexammoniate, said reaction being conducted in an excess liquid ammonia medium, and subsequently evaporating from the resulting product mixture the excess liquid ammonia.

3. A process which comprises contacting delta-valerolactone with from about 0.01 to about 3.0 weight percent of a polymerization catalyst which is slurried in an inert normally-liquid organic vehicle, based on the weight of said delta-valerolactone; at a temperature in the range of from about −20° to about 225° C.; under substantially anhydrous conditions; for a period of time sufficient to produce a polymer; said polymerization catalyst being prepared by a process which comprises reacting alkaline earth metal hexammoniate with from about 0.4 to 1.01 mol of lower olefin oxide and from about 0.3 to 0.8 mol of lower saturated aliphatic organic nitrile, based on 1.0 mol of said alkaline earth metal hexammoniate, said reaction being conducted in an excess liquid ammonia medium, at a temperature in the range of from above about the freezing point of ammonia to about 25° C., under a pressure sufficient to maintain said ammonia in an essentially liquid state, followed by evaporating the excess liquid ammonia to leave a solid catalytically active product, and subsequently slurrying said catalytically active product in an inert normally-liquid organic vehicle.

4. The process of claim 3 wherein said lower olefin oxide is ethylene oxide and wherein said lower saturated aliphatic organic nitrile is acetonitrile in the preparation of the polymerization catalyst.

5. The process of claim 3 wherein said lower olefin oxide is propylene oxide and wherein said lower saturated aliphatic organic nitrile is acetonitrile in the preparation of the polymerization catalyst.

6. A process which comprises contacting an alkyl-substituted delta-valerolactone with from about 0.01 to about 3.0 weight percent of a polymerization catalyst which is slurried in an inert normally-liquid organic vehicle, based on the weight of said alkyl-substituted delta-valerolactone; at a temperature in the range of from about −20° C. to about 225° C.; under substantially anhydrous conditions; for a period of time sufficient to produce a polymer; said polymerization catalyst being prepared by a process which comprises reacting alkaline earth metal hexammoniate with from about 0.4 to 1.0 mol of lower olefin oxide and from about 0.3 to 0.8 mol of lower saturated aliphatic organic nitrile, based on 1.0 mol of said alkaline earth metal hexammoniate, said reaction being conducted in an excess liquid ammonia medium, at a temperature in the range of from above about the freezing point of ammonia to about 25° C., under a pressure sufficient to maintain said ammonia in an essentially liquid state, followed by evaporating the excess liquid ammonia to leave a solid catalytically active product, and subsequently slurrying said catalytically active product in an inert normally-liquid organic vehicle.

7. The process of claim 6 wherein said lower olefin oxide is ethylene oxide and wherein said lower saturated aliphatic organic nitrile is acetonitrile in the preparation of the polymerization catalyst.

8. The process of claim 6 wherein said lower olefin oxide is propylene oxide and wherein said lower saturated aliphatic organic nitrile is acetonitrile in the preparation of the polymerization catalyst.

9. A process which comprises contacting epsilon-caprolactone with from about 0.01 to about 3.0 weight percent of a polymerization catalyst which is slurried in an inert normally-liquid organic vehicle, based on the weight of said epsilon-caprolactone; at a temperature in the range of from about −20° C. to about 225° C.; under substantially anhydrous conditions; for a period of time sufficient to produce a polymer; said polymerization catalyst being prepared by a process which comprises reacting alkaline earth metal hexammoniate with from about 0.4 to 1.0 mol of lower olefin oxide and from about 0.3 to 0.8 mol of lower saturated aliphatic organic nitrile, based on 1.0 mol of said alkaline earth metal hexammoniate, said reaction being conducted in an excess liquid ammonia medium, at a temperature in the range of from above about the freezing point of ammonia to about 25° C., under a pressure sufficient to maintain said ammonia in an essentially liquid state, followed by evaporating the excess liquid ammonia to leave a solid catalytically active product, and subsequently slurrying said catalytically active product in an inert normally-liquid organic vehicle.

10. The process of claim 9 wherein said lower olefin oxide is ethylene oxide and wherein said lower saturated aliphatic organic nitrile is acetonitrile in the preparation of the polymerization catalyst.

11. The process of claim 9 wherein said lower olefin oxide is propylene oxide and wherein said lower saturated aliphatic organic nitrile is acetonitrile in the preparation of the polymerization catalyst.

12. A process which comprises contacting an alkyl-substituted epsilon-caprolactone with from about 0.01 to about 3.0 weight percent of a polymerization catalyst which is slurried in an inert normally-liquid organic vehicle, based on the weight of said alkyl-substituted epsilon-caprolactone; at a temperature in the range of from about —20° C. to about 225° C.; under substantially anhydrous conditions; for a period of time sufficient to produce a polymer; said polymerization catalyst being prepared by a process which comprises reacting alkaline earth metal hexammoniate with from about 0.4 to 1.0 mol of lower olefin oxide and from about 0.3 to 0.8 mol of lower saturated aliphatic organic nitrile, based on 1.0 mol of said alkaline earth metal hexammoniate, said reaction being conducted in an excess liquid ammonia medium, at a temperature in the range of from above about the freezing point of ammonia to about 25° C., under a pressure sufficient to maintain said ammonia in an essentially liquid state, followed by evaporating the excess liquid ammonia to leave a solid catalytically active product, and subsequently slurrying said catalytically active product in an inert normally-liquid organic vehicle.

13. The process of claim 12 wherein said lower olefin oxide is ethylene oxide and wherein said lower saturated aliphatic organic nitrile is acetonitrile in the preparation of the polymerization catalyst.

14. The process of claim 12 wherein said lower olefin oxide is propylene oxide and wherein said lower saturated aliphatic organic nitrile is acetonitrile in the preparation of the polymerization catalyst.

15. A process which comprises contacting a monomeric lactone admixture comprising delta-valerolactone and an alkyl-substituted delta-valerolactone with from about 0.01 to about 3.0 weight percent of a polymerization catalyst which is slurried in an inert normally-liquid organic vehicle, based on the total weight of the monomeric lactone feed; at a temperature in the range of from about —20° C. to about 225° C.; under substantially anhydrous conditions; for a period of time sufficient to produce a polymer; said polymerization catalyst being prepared by a process which comprises reacting alkaline earth metal hexammoniate with from about 0.4 to 1.0 mol of lower olefin oxide and from about 0.3 to 0.8 mol of lower saturated aliphatic organic nitrile, based on 1.0 mol of said alkaline earth metal hexammoniate, said reaction being conducted in an excess liquid ammonia medium, at a temperature in the range of from above about the freezing point of ammonia to about 25° C., under a pressure sufficient to maintain said ammonia in an essentially liquid state, followed by evaporating the excess liquid ammonia to leave a solid catalytically active product, and subsequently slurrying said catalytically active product in an inert normally-liquid organic vehicle.

16. A process which comprises contacting a monomeric lactone admixture comprising delta-valerolactone and epsilon-caprolactone with from about 0.01 to about 3.0 weight percent of a polymerization catalyst which is slurried in an inert normally-liquid organic vehicle, based on the total weight of the monomeric lactone feed; at a temperature in the range of from about —20° C. to about 200° C.; under substantially anhydrous conditions; for a period of time sufficient to produce a polymer; said polymerization catalyst being prepared by a process which comprises reacting alkaline earth metal hexammoniate with from about 0.4 to 1.0 mol of lower olefin oxide and from about 0.3 to 0.8 mol of lower saturated aliphatic organic nitrile, based on 1.0 mol of said alkaline earth metal hexammoniate, said reaction being conducted in an excess liquid ammonia medium, at a temperature in the range of from above about the freezing point of ammonia to about 25° C., under a pressure sufficient to maintain said ammonia in an essentially liquid state, followed by evaporating the excess liquid ammonia to leave a solid catalytically active product, and subsequently slurrying said catalytically active product in an inert normally-liquid organic vehicle.

17. A process which comprises contacting a monomeric lactone admixture comprising delta-valerolactone and an alkyl-substituted epsilon-caprolactone with from about 0.01 to about 3.0 weight percent of a polymerization catalyst which is slurried in an inert normally-liquid organic vehicle, based on the total weight of the monomeric lactone feed; at a temperature in the range of from about —20° C. to about 225° C.; under substantially anhydrous conditions; for a period of time sufficient to produce a polymer; said polymerization catalyst being prepared by a process which comprises reacting alkaline earth metal hexammoniate with from about 0.4 to 1.0 mol of lower olefin oxide and from about 0.3 to 0.8 mol of lower saturated aliphatic organic nitrile, based on 1.0 mol of said alkaline earth metal hexammoniate, said reaction being conducted in an excess liquid ammonia medium, at a temperature in the range of from above about the freezing point of ammonia to about 25° C., under a pressure sufficient to maintain said ammonia in an essentially liquid state followed by evaporating the excess liquid ammonia to leave a solid catalytically active product, and subsequently slurrying said catalytically active product in an inert normally-liquid organic vehicle.

18. A process which comprises contacting a monomeric lactone admixture comprising epsilon-caprolactone and an alkyl-substituted delta-valerolactone with from about 0.01 to about 3.0 weight percent of a polymerization catalyst which is slurried in an inert normally-liquid organic vehicle, based on the total weight of the monomeric lactone feed; at a temperature in the range of from about —20° C. to about 225° C.; under substantially anhydrous conditions; for a period of time sufficient to produce a polymer; said polymerization catalyst being prepared by a process which comprises reacting alkaline earth metal hexammoniate with from about 0.4 to 1.0 mol of lower olefin oxide and from about 0.3 to 0.8 mol of lower saturated aliphatic organic nitrile, based on 1.0 mol of said alkaline earth metal hexammoniate, said reaction being conducted in an excess liquid ammonia medium, at a temperature in the range of from above about the freezing point of ammonia to about 25° C., under a pressure sufficient to maintain said ammonia in an essentially liquid state, followed by evaporating the excess liquid ammonia to leave a solid catalytically active product, and subsequently slurrying said catalytically active product in an inert normally-liquid organic vehicle.

19. A process which comprises contacting a monomeric lactone admixture comprising epsilon-caprolactone and alkyl-substituted epsilon-caprolactone with from about 0.01 to about 3.0 weight percent of a polymerization catalyst which is slurried in an inert normally-liquid organic vehicle, based on the total weight of the monomeric lactone feed; at a temperature in the range of from about —20° C. to about 225° C.; under substantially anhydrous conditions; for a period of time sufficient to produce a polymer; said polymerization catalyst being prepared by a process which comprises reacting alkaline earth metal hexammoniate with from about 0.4 to 1.0 mol of lower olefin oxide and from about 0.3 to 0.8 mol of lower saturated aliphatic organic nitrile, based on 1.0 mol of said alkaline earth metal hexammoniate, said reaction being conducted in an excess liquid ammonia medium, at a temperature in the range of from above about the freezing point of ammonia to about 25° C., under a pressure sufficient to maintain said ammonia in an essentially liquid state, followed by evaporating the excess liquid ammonia to leave a solid catalytically active product, and subsequently slurrying said catalytically active product in an inert normally-liquid organic vehicle.

20. A process which comprises contacting a monomeric lactone admixture comprising an alkyl-substituted epsilon-caprolactone and an alkyl-substituted delta-valerolactone with from about 0.01 to about 3.0 weight percent of a polymerization catalyst which is slurried in an inert normally-liquid organic vehicle, based on the total weight of the monomeric lactone feed; at a temperature in the range of from about —20° C. to about 225° C.; under substantially anhydrous conditions; for a period of time sufficient to produce a polymer; said polymerization catalyst being prepared by a process which comprises reacting alkaline earth metal hexammoniate with from about 0.4 to 1.0 mol of lower olefin oxide and from about 0.3 to 0.8 mol of lower saturated aliphatic organic nitrile, based on 1.0 mol of said alkaline earth metal hexammoniate, said reaction being conducted in an excess liquid ammonia medium, at a temperature in the range of from above about the freezing point of ammonia to about 25° C., under a pressure sufficient to maintain said ammonia in an essentially liquid state, followed by evaporating the excess liquid ammonia to leave a solid catalytically active product, and subsequently slurrying said catalytically active product in an inert normally-liquid organic vehicle.

21. A process which comprises contacting a monomeric lactone admixture comprising two alkyl-substituted delta-valerolactones with from about 0.01 to about 3.0 weight percent of a polymerization catalyst which is slurried in an inert normally-liquid organic vehicle, based on the total weight of the monomeric lactone feed; at a temperature in the range of from about −20° C. to about 225° C.; under substantially anhydrous conditions; for a period of time sufficient to produce a polymer; said polymerization catalyst being prepared by a process which comprises reacting alkaline earth metal hexammoniate with from about 0.4 to 1.0 mol of lower olefin oxide and from about 0.3 to 0.8 mol of lower saturated aliphatic organic nitrile, based on 1.0 mol of said alkaline earth metal hexammoniate, said reaction being conducted in an excess liquid ammonia medium, at a temperature in the range of from above about the freezing point of ammonia to about 25° C., under a pressure sufficient to maintain said ammonia in an essentially liquid state, followed by evaporating the excess liquid ammonia to leave a solid catalytically active product, and subsequently slurrying said catalytically active product in an inert normally-liquid organic vehicle.

22. A process which comprises contacting a monomeric lactone admixture comprising two alkyl-substituted epsilon-caprolactones with from about 0.01 to about 3.0 weight percent of a polymerization catalyst which is slurried in an inert normally-liquid organic vehicle, based on the total weight of the monomeric lactone feed; at a temperature in the range of from about −20° C. to about 225° C.; under substantially anhydrous conditions; for a period of time sufficient to produce a polymer; said polymerization catalyst being prepared by a process which comprises reacting alkaline earth metal hexammoniate with from about 0.4 to 1.0 mol of lower olefin oxide and from about 0.3 to 0.8 mol of lower saturated aliphatic organic nitrile, based on 1.0 mol of said alkaline earth metal hexammoniate, said reaction being conducted in an excess liquid ammonia medium, at a temperature in the range of from above about the freezing point of ammonia to about 25° C., under a pressure sufficient to maintain said ammonia in an essentially liquid state, followed by evaporating the excess liquid ammonia to leave a solid catalytically active product, and subsequently slurrying said catalytically active product in an inert normally-liquid organic vehicle.

References Cited in the file of this patent

UNITED STATES PATENTS

| | | |
|---|---|---|
| 2,765,284 | Bersworth | Oct. 2, 1956 |
| 2,878,236 | Young et al. | Mar. 17, 1959 |